(12) United States Patent
Bruekers et al.

(10) Patent No.: US 7,454,620 B2
(45) Date of Patent: Nov. 18, 2008

(54) METHOD, DEVICE AND ARRANGEMENT FOR INSERTING EXTRA INFORMATION

(75) Inventors: Alphons Antonius Maria Lambertus Bruekers, Eindhoven (NL); Geert Florimond Gerard Depovere, Eindhoven (NL); Paulus George Maria De Bot, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 1328 days.

(21) Appl. No.: 09/968,140

(22) Filed: Oct. 1, 2001

(65) Prior Publication Data

US 2002/0078357 A1 Jun. 20, 2002

(30) Foreign Application Priority Data

Oct. 25, 2000 (EP) .................................. 00203701

(51) Int. Cl.
*H04L 9/00* (2006.01)
(52) U.S. Cl. ...................................... 713/176; 713/180
(58) Field of Classification Search .................. 713/176, 713/180
See application file for complete search history.

(56) References Cited

U.S. PATENT DOCUMENTS 3,476,880 A * 11/1969 Flanagan ..................... 380/252
6,094,483 A 7/2000 Fridrich et al. ................ 380/28
6,240,121 B1 * 5/2001 Senoh ......................... 375/130
6,345,100 B1 * 2/2002 Levine ........................ 380/205

FOREIGN PATENT DOCUMENTS

| EP | 0777197 A2 | 6/1997 |
| EP | 0891071 A2 | 1/1999 |
| EP | 1039414 A2 * | 9/2000 |

OTHER PUBLICATIONS

Bender et al., "Techniques For Data Hiding," IBM Systems Journal, 1996, pp. 313-335.

* cited by examiner

*Primary Examiner*—Gilberto Barron, Jr.
*Assistant Examiner*—Samson B Lemma
(74) *Attorney, Agent, or Firm*—Larry Liberchuk

(57) ABSTRACT

A method, device and arrangement insert extra information in an input signal in the acoustical or visual domain. A representation in the electrical domain is received, a watermark including the extra information is generated, and a watermark signal representing the watermark is output to the acoustical or visual domain. The watermark signal representing the watermark is merged with the input signal in the acoustical or visual domain. Any recording unit which attempts to record the input signal will automatically record the watermark signal as well, so no unwatermarked specimens are made available. The device may be realized as a computer program product, or as a small portable unit, which may be worn by a person to automatically watermark anything spoken. The device may be used to protect physical objects against unauthorized taking of photographs, by projecting a visual watermark signal towards the source or physical object.

15 Claims, 2 Drawing Sheets

METHOD, DEVICE AND ARRANGEMENT FOR INSERTING EXTRA INFORMATION

Figure 1:
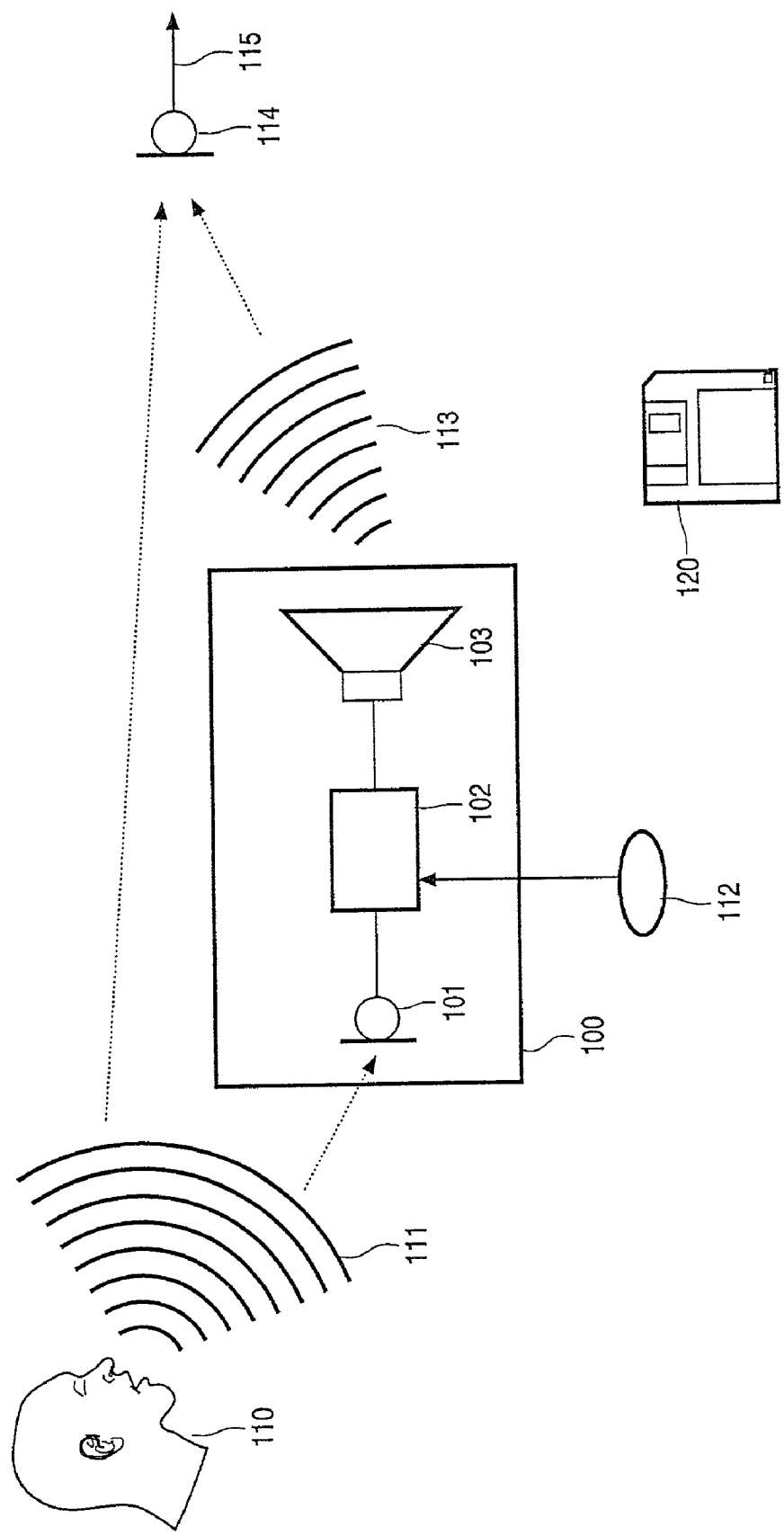

The invention relates to a method of inserting extra information in an input signal in a first domain.

The invention further relates to a device for inserting extra information in an input signal in a first domain.

The invention further relates to an arrangement for inserting extra information in an input signal in a first domain.

The invention further relates to a computer program product.

Watermarking, the process of inserting extra information in an input signal such as audio or video, is an important and well-known technique to mark or protect those input signals. A movie can be watermarked so its origin can be identified, or unauthorized copies can be distinguished from the original. Watermarks can be used with still images to locate copies reproduced by unauthorized third parties, by simply downloading images from the information services offered by those third parties and examining the downloaded images for the watermark.

Watermarks can also be used to embed metadata, such as an Internet Uniform Resource Locator (URL), in the input signal, for instance in a movie. A user who views the movie at his personal entertainment station can access the embedded metadata to access, for instance, the World-Wide Web site of the movie.

In known watermarking schemes, the input signal that has to be watermarked is first converted from a first domain, e.g. the audio domain, to a second domain, e.g. the electrical domain. The representation in the second domain of the input signal is then analyzed and watermarked. The watermark is then inserted into the input signal, and the thusly obtained watermarked signal can subsequently be output to the first domain. When the watermarked signal is distributed further, it can be analyzed to retrieve the watermark in order to prove ownership, retrieve embedded metadata, and so on.

A disadvantage of these known schemes is that the watermarked signal exists independently of the original, unmodified, input signal. The input signal needs to be fed to a device which generates the watermark and outputs the watermarked signal, but this does not affect the original input signal. Since it is undesirable to make the original unwatermarked signal available, the known schemes can only be used to watermark signals in controlled situations, such as in a recording studio. The music generated by a band during a live "unplugged" performance, for example, is released in an uncontrolled situation, and bootleg copies can be made without the watermark. This disadvantage becomes even more apparent with visual input signals, such as exhibitions or interviews. An interview in a public location cannot be completely protected, since it is always possible for a third party to make his own recording of the interview with a device that does not embed the watermark in the recording.

It is an object of the invention to provide a method according to the preamble, which produces a watermarked input signal and prevents the availability of unwatermarked specimens of the input signal, even in uncontrolled environments.

This object is achieved in the invention in a method which comprises the steps of receiving a representation of the input signal, the representation being in a second domain different from the first domain, generating a watermark comprising the extra information, and outputting a watermark signal representing the watermark to the first domain for merging the watermark signal with the input signal. Preferably the first domain is one of the acoustic domain and the visual domain, and the second domain is the electrical domain. The method according to the invention generates a watermark for the representation of the input signal, and instead of inserting the watermark in the representation and outputting that representation as a watermarked signal, it outputs a representation of the watermark to the first domain where it can merge with the original input signal. Thus, the original input signal itself is watermarked, and no unwatermarked specimens exist. For instance, consider the exhibition of a painting. A watermark is generated for the painting, and instead of outputting a copy of the painting with the watermark embedded, a visual watermark is projected on the actual painting hanging on the wall. Now all photographs etc. made of the painting will have the watermark embedded.

In an embodiment the watermark is generated further based on the input signal. An advantage of this embodiment is that adapting the watermark based on the input signal allows the creation of a watermark that better fits the input signal, for example by being less obtrusive. To this end, the watermark generation may comprise perceptual masking. For example, in the case of an audio input signal from an interview, the voice of the person being interviewed could be analyzed and the watermark signal would be adapted accordingly. Similarly, in the case of a video input signal from an exhibited piece of art, the lighting conditions could be analyzed and the watermark signal would be adapted accordingly.

In a further embodiment the watermark signal is output towards a source of the input signal. An advantage of this embodiment is that in this way, multiple input signals are mixed with the watermark signal, regardless of their respective directions. In the case of the exhibited piece of art, the watermark signal could be projected by a lighting system on the piece of art so that there is no possibility that a video signal can be generated without including the watermark signal mixed with the image of the piece of art.

In a further embodiment the watermark signal is output on a surface of a source of the input signal. An advantage of this embodiment is that it allows the source of the input signal to protect itself against unauthorized recordings. For example, a person wearing a piece of clothing comprising a flexible display could project a visual watermark signal from the flexible display so that anyone who takes a photo of him will always have a visual watermark in the photo.

It is a further object of the invention to provide a device according to the preamble, which produces a watermarked input signal and prevents the availability of unwatermarked specimens of the input signal, even in uncontrolled environments.

This object is achieved in the invention in a device which comprises receiving means for receiving a representation of the input signal, the representation being in a second domain different from the first domain, generating means for generating a watermark comprising the extra information, and output means for outputting a watermark signal representing the watermark to the first domain for merging the watermark signal with the input signal.

It is a further object of the invention to provide an arrangement according to the preamble, which produces a watermarked input signal and prevents the availability of unwatermarked specimens of the input signal, even in uncontrolled environments.

This object is achieved in the invention in an arrangement which comprises receiving means for receiving a representation of the input signal, the representation being in a second domain different from the first domain, generating means for generating a watermark comprising the extra information, output means for outputting a watermark signal representing the watermark to the first domain for merging the watermark signal with the input signal, and merging means for generating a watermarked input signal by receiving the merged watermark signal and input signal. In this arrangement according to the invention, the watermark signal and the original input signal are mixed to obtain a watermarked input signal, which can then be processed further using other techniques, if desired. The arrangement is typically realized using a first device which is arranged to receive the representation, generate the watermark and output the watermark signal as described above, and a second device which obtains the original input signal mixed with the watermark signal. In the case of the exhibition of the piece of art, the first device would be the lighting system projecting the watermark signal onto the piece of art, and the second device would be, for instance, a camera.

It is a further object of the invention to provide a computer program product being arranged for causing a processor to execute the method according to the invention.

Figure 2:
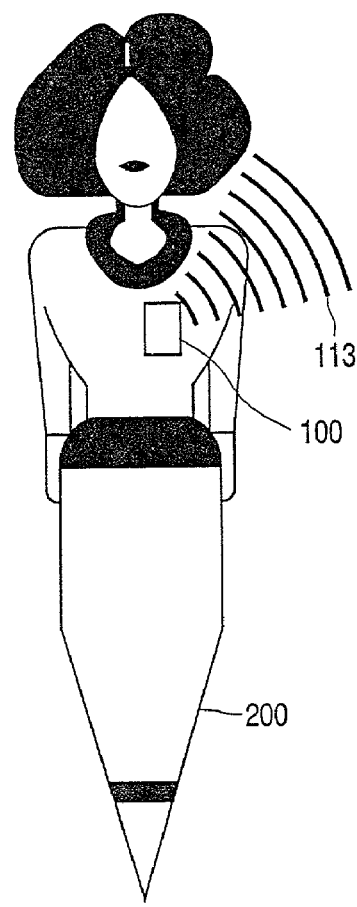

These and other aspects of the invention will be apparent from and elucidated with reference to the embodiments shown in the drawing, in which:

FIG. 1 schematically shows a first embodiment of the device according to the invention;

FIG. 2 schematically shows a second embodiment of the device; and

Figure 3:
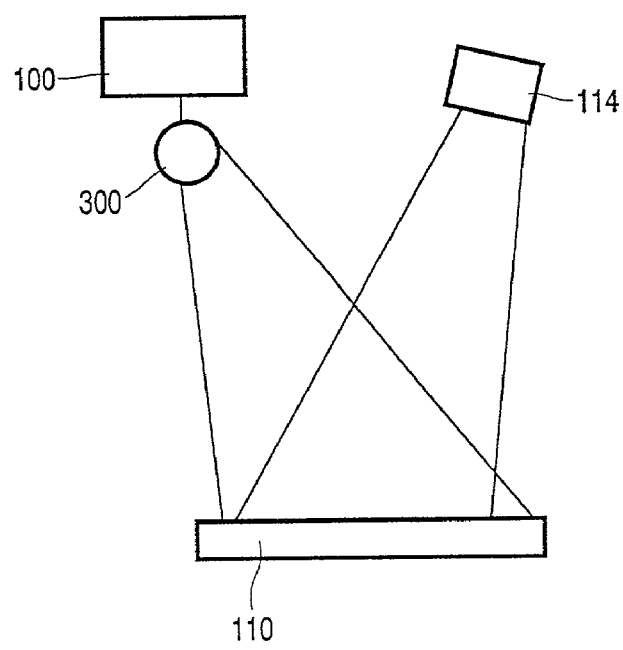

FIG. 3 schematically shows a third embodiment of the device.

Throughout the figures, same reference numerals indicate similar or corresponding features. Some of the features indicated in the drawings are typically implemented in software, and as such represent software entities, such as software modules or objects.

FIG. 1 schematically shows a first embodiment of the device 100 according to the invention. The device 100 comprises receiving module 101, generating module 102, and output module 103. A source 110 generates an input signal 111. The present invention can be used in many situations, with many different sources 110 generating many different input signals 111. For instance, the source 110 can be a natural person giving an interview, or singing a song or giving a lecture. The source 110 can be a band, which gives a concert, or another live performance. The input signal 111 is in a first domain, often the acoustical or visual domain, e.g. in the form of an audio or video signal, although other domains are also possible.

The receiving module 101 receives a representation of the input signal 111. This representation is in a second domain different from the first domain. Preferably the second domain is the electrical domain, in which case the representation typically is an electrical signal obtained by having a microphone record the input signal 111. Other conversions are also possible, for instance by digitizing the input signal 111 or receiving a broadcast signal from the source 110. The reception of the representation may optionally involve further processing steps after picking up the input signal and converting it to the second domain.

The representation is fed to the generating module 102, which generates a watermark comprising extra information 112 for use with the representation. The watermark can be generated using any watermarking technique appropriate for the input signal 111 and is preferably based on the representation. In particular, additive watermarking techniques can be used. Using additive watermarking techniques, a watermark is generated which is normally mixed with the input signal 111 by means of addition to form a watermarked signal. However, in accordance with the invention, the output module 103 outputs a watermark signal 113 representing the watermark to the first domain for merging the watermark signal 113 with the input signal 111.

The outputting can be done directly or indirectly. In the direct case, the watermark signal 113 can be output so that it directly mixes with the input signal 111 and they reach some external reception unit 114 together. In the indirect case, the watermark signal 113 reaches the reception unit 114 via the input signal 111 that needs to be watermarked. This can be done, for instance, by outputting the watermark signal 113 towards the source 110 of the input signal 111. This is particularly appropriate when the first domain is the visual domain. For instance, consider the exhibition of a painting. A watermark is generated for the painting, and instead of outputting a copy of the painting with the watermark embedded, a visual watermark is projected on the actual painting hanging on the wall. Now all photographs etc. made of the painting will have the watermark embedded.

The watermark being generated can be imperceptible or unobtrusive. Imperceptible watermarks are invisible or inaudible for a human observer, while unobtrusive watermarks are visible or audible but not annoying to the human observer. The choice depends on the particular application of the device 100. It may be desirable in some situations to reveal the fact that the input signal 111 is being watermarked, so that potential adversaries are discouraged from producing an illicit recording. The watermark can alternatively be used to embed metadata in the input signal, which typically is not intended for human observers, so it should be invisible and inaudible.

The extra information 112 can be static, e.g. constant over time, or dynamic. The identity of the person interviewed is an example of a static payload, while information about the time and location of the interview is an example of a dynamic payload, since it may differ during the interview.

The device 100 may optionally generate the watermark further based on an analysis of environmental parameters of the input signal 111. This allows the creation of a watermark that better fits the input signal 111, for example by being less obtrusive. To this end, the generating module 102 may be arranged for perceptual masking. For example, in the case of an audio input signal from an interview, the voice of the person being interviewed could be analyzed and the watermark signal would be adapted accordingly. Similarly, in the case of a video input signal from an exhibited piece of art, the lighting conditions could be analyzed and the watermark signal would be adapted accordingly. These adaptations are made in order to improve the perceptive performance of the device 100.

The arrangement comprising the receiving module 101, generating module 102, output module 103 and reception unit 114 is capable of generating a watermarked input signal 115 from the original input signal 111. Using this arrangement, no unwatermarked specimens of the input signal 111 are made available.

The device 100 can be realized as a computer program product 120 being arranged for causing a processor to execute the method according to the invention. This computer program product 120 enables a programmable device when executing said computer program product to function as the device 100.

FIG. 2 schematically shows a second embodiment of the device 100, here shown as a small portable unit, which can be worn or carried by a person 200. This allows that person 200, for instance, to watermark anything she says by having her portable unit emit an acoustic watermark signal 113 that mixes with her speech.

The device 100 can also be realized as a flexible display or loudspeaker integrated in a piece of clothing. This allows the wearer of that piece of clothing to watermark anything she says, or to have any picture taken of her to be watermarked. In that case, the watermark signal 113 is output on a surface of the source 200 of the input signal 111.

The method according to the invention is especially suitable with mobile devices, such as a mobile telephone, as the reception unit 114. Since the watermarked input signal 115, preferably being an audio signal, travels over the acoustical domain to the reception unit 114, it follows that any device having a microphone or similar reception means can pick it up, and, with suitable equipment, can detect the watermark and process it.

In practice, this means that the owner of a mobile device comprising such reception means can detect this watermark by simply pointing his mobile device towards the output module 103.

FIG. 3 schematically shows a third embodiment of the device 100, shown here with a lighting unit 300 as part of the output module 103. The watermark signal 113 is output towards the source 110 of the input signal 111, which can be any source 110 that needs to be watermarked, such as a piece of art or a soccer match or some other event. Light filters in the lighting unit 300 containing the watermark pattern can be used to create the required lighting. This "watermarked light" is then used to lighten the scene that may be photographed or filmed by third parties. The light filters may contain a dynamically changing watermark pattern to better protect against video recordings.

The device 100 may be arranged for simultaneous generation of audio and video watermarks. It is possible to generate and insert a watermark in the conventional way in the input signal 111 mixed with the watermark signal 113 produced by the device 100.

The invention claimed is:

1. A method of inserting extra information in an input signal, comprising:
   converting the input signal in a first domain, which is human perceptible, into a representation in a second domain different from the first domain;
   generating a watermark comprising the extra information; and
   outputting a watermark signal representing the watermark to the first domain for merging the watermark signal with the input signal.

2. A method as claimed in claim 1, where the first domain is one of an acoustic domain and a visual domain.

3. A method as claimed in claim 1, where the second domain is an electrical domain.

4. A method as claimed in claim 1, where the watermark is generated based on the input signal.

5. A method as claimed in claim 1, where the watermark signal is output towards a source of the input signal.

6. A method as claimed in claim 1, where the watermark signal is output on a surface of a source of the input signal.

7. A computer-implemented device for inserting extra information in an input signal, comprising:
   receiving means for converting the input signal in a first domain, which is human perceptible, into a representation in a second domain different from the first domain;
   generating means for generating a watermark comprising the extra information; and
   output means for outputting a watermark signal representing the watermark to the first domain for merging the watermark signal with the input signal.

8. A computer program, embedded on a computer-readable medium, for causing a processor to convert the input signal in a first domain, which is human perceptible, into a representation in a second domain different from the first domain; to generate a watermark comprising the extra information; and to output a watermark signal representing the watermark to the first domain for merging the watermark signal with the input signal.

9. A method comprising:
   receiving a human-perceptible signal;
   generating an electrical signal that represents the human-perceptible signal;
   generating, based on the electrical signal, a first watermark signal in an electrical domain;
   generating, based on the first watermark signal, a second watermark signal in a human-perceptible domain; and
   combining the second watermark signal and the human-perceptible signal to generate a watermarked human-perceptible signal.

10. The method of claim 9, wherein the human-perceptible domain is an acoustic domain.

11. The method of claim 9, wherein the human-perceptible domain is a visual domain.

12. The method of claim 9, wherein the human-perceptible signal is generated by a source including a person.

13. The method of claim 12, wherein the second watermark signal is generated by a device that is worn or carried by the person.

14. The method of claim 9, wherein a source of the human-perceptible signal includes a surface, and the combining includes projecting the second watermark signal onto the surface.

15. The method of claim 9, wherein the second watermark signal is imperceptible or unobtrusive in the watermarked human-perceptible signal.

* * * * *